H. J. WESSELS.
APPARATUS FOR THE STERILIZATION OF LIQUIDS.
APPLICATION FILED OCT. 11, 1904.
906,975.
Patented Dec. 15, 1908.
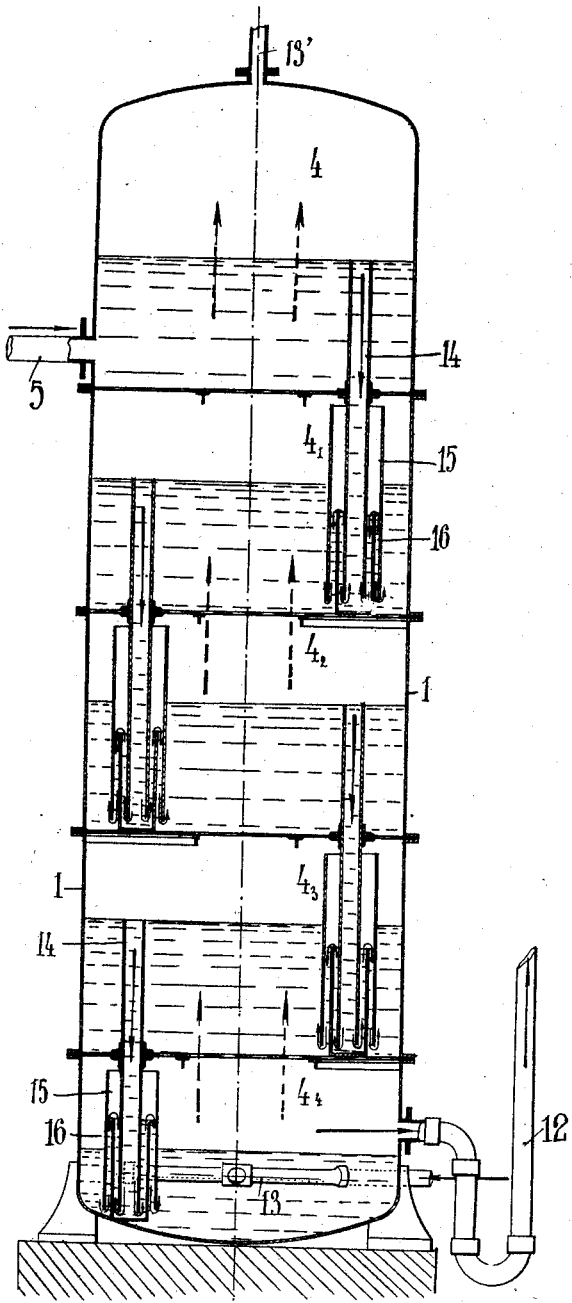
WITNESSES
INVENTOR
BY
ATTORNEYS

UNITED STATES PATENT OFFICE.

HENRY JACQUES WESSELS, OF PARIS, FRANCE.

APPARATUS FOR THE STERILIZATION OF LIQUIDS.

No. 906,975.  Specification of Letters Patent.  Patented Dec. 15, 1908.

Application filed October 11, 1904. Serial No. 228,076.

*To all whom it may concern:*

Be it known that I, HENRY JACQUES WESSELS, a subject of the Queen of the Netherlands, and resident of Paris, France, have invented a new and useful Improvement Relating to Apparatus for the Sterilization of Liquids, which improvement is fully set forth in the following specification.

This invention has for its object an apparatus for the sterilizing of liquids, and more particularly of water, by means of ozone.

In order that the invention may be readily and clearly understood, reference is had to the accompanying drawing, which shows, by way of example, the apparatus referred to.

The sterilizer represented in the drawing is based upon the principle of multiple and systematic mixings or washings of the ozone in the liquid to be sterilized.

When water is to be sterilized, which is the case, most frequently presented, the water passes through the apparatus from above downwards, while the ozone traverses it from below upwards. The ascending current of ozone mixes repeatedly in its passage in extremely fine bubbles with the stream of descending water. In this manner the treatment is systematic, the water being submitted to the ozone in its least concentrated condition when it is still impure, while as it becomes purified it encounters on its passage ozone which is more and more concentrated and does not leave the apparatus until it has been brought into contact with ozone presenting its maximum of oxidizing power.

The sterilizing device comprises a receiver 1 constructed, for example, of metal plates riveted together, and divided into a plurality of compartments 4, $4^1$, $4^2$—by plates 3, which are finely perforated in such a manner that the capillarity of the holes is an obstacle to the passage of the water, while the upward free circulation of the ozone is permitted.

In the sterilizer illustrated, the passage of the liquid from one compartment to the compartment beneath it is effected through siphons, each siphon comprising a tube 14, the upper orifice of which determines the level of the liquid in the compartment, and of tubes 15 and 16, concentric with the first-named tube. The tube 16 is closed at its bottom, and receives the lower extremity of the inner tube 14. The outer tube 15 is open at top and bottom, and determines, in connection with the tube 15, the path and delivery of the liquid indicated by the arrows in the drawing. A perforated tube 13 admits ozone into the lowest compartment, and a conduit 12, preferably in form of a trap, permits the exit of the liquid after traversing the several compartments.

The liquid to be sterilized enters through the conduit 5 into the upper compartment. As this liquid is not able to pass through the capillary holes in partitions 3, it rises in the upper compartment 4, to the orifice of pipe 14 through which it passes into compartment $4^1$, first filling tube 16, thereby sealing the lower end of pipe 14, and being directed downward by tube 15 and delivered at the floor of the next compartment. This course of the liquid is continued from compartment to compartment to the bottom, where it finds its exit through pipe 12.

The ozone coming from the ozonizers enters the vessel through a perforated tube 13 which passes along the bottom of the lower compartment, suitable mechanism (not shown) being connected to said pipe 13 to give to the ozone the pressure required for its ascending path through the liquid. The ozone escapes through the holes in the tube 13 and rises in the apparatus, mixing in its ascending current with the water a number of times, as already mentioned. The outlet for the ozone is at 13′ at the upper part of the apparatus.

What I claim and desire to secure by Letters Patent of the United States is:—

A sterilizing column of the character described comprising a casing having gas and liquid inlets and outlets, plates having capillary perforations dividing the column into liquid holding compartments, a conduit between each two compartments, said conduit having its liquid inlet end located a distance above the bottom of one compartment to control the height of the column of liquid therein and having its delivery end opening near the bottom of the second compartment, a cup for receiving the lower end of said conduit to form a trap therewith and an open end cylinder surrounding said cup for directing the liquid to be treated into contact with the gas rich in sterilizing constituent entering through said capillary openings, said openings being of a size adapted to permit gas to pass upward under superatmospheric
5 pressure and to prevent downward passage of liquid therethrough.

In testimony whereof I have signed this specification in the presence of two subscribing witnesses.

HENRY JACQUES WESSELS.

Witnesses:
EMILE LEDRET,
ARCHIBALD R. BAKER.